United States Patent
Pfeifer

[15] 3,667,281
[45] June 6, 1972

[54] VACUUM TESTER FOR PACKAGES WITH FLEXIBLE COVERS

[72] Inventor: Charles F. Pfeifer, 39 Parade Hill Lane, New Canaan, Conn. 06840

[22] Filed: Nov. 4, 1970

[21] Appl. No.: 86,706

[52] U.S. Cl. ............................................................... 73/37
[51] Int. Cl. ..................................... G01m 3/12, G01m 3/26
[58] Field of Search ..................... 73/37–37.9, 389, 73/49.3, 52

[56] References Cited

UNITED STATES PATENTS

| | | | |
|---|---|---|---|
| 3,027,753 | 4/1962 | Harder, Jr. | 73/49.3 X |
| 3,343,404 | 9/1967 | La Rosa et al. | 73/49.3 |
| 3,513,689 | 5/1970 | Nelson | 73/37 |

Primary Examiner—Louis R. Prince
Assistant Examiner—William A. Henry, II
Attorney—Ralph R. Roberts

[57] ABSTRACT

A vacuum tester for the non-destructive testing of vacuum packages, particularly those provided in the packaging of meat and heat-and-serve products wherein one of the packaging members is a flexible member such as film. This tester includes a viewing chamber having a selective control means disposed to bring the chamber to a reduced pressure such as 28 or 30 inches of mercury. The closed chamber is brought under vacuum which is gradually increased until the flexible member enclosing the product just starts to relax at which point the selective control means is manipulated to maintain this vacuum level and at this stabilized pressure a gauge is read to determine the degree of vacuum within the chamber which is also the vacuum within the package.

7 Claims, 3 Drawing Figures

PATENTED JUN 6 1972 3,667,281

INVENTOR.
CHARLES F. PFEIFER

BY

Ralph R. Roberts

AGENT

VACUUM TESTER FOR PACKAGES WITH FLEXIBLE COVERS

BACKGROUND OF THE INVENTION

1. Field of the Invention

In reference to the classification of art as established in the U.S. Patent Office this patent pertains to the class entitled, "Measuring and Testing," and more particularly to the subclass therein of "with fluid pressure" and to the further subclass of "leakage of a sealed receptacle."

2. Description of the Prior Art

Non-destructive testing and quick leak testers are of course known to the art and are for example shown in U.S. Pat. No. 1,974,026 to HICKS issuing on Sept. 18, 1934; in a vacuum testing device shown in U.S. Pat. No. 2,784,373 to LAWRENCE et al. issuing Mar. 5, 1957 and also in U.S. Pat. No. 3,343,404 to LA ROSA et al. issuing Sept. 26, 1967. In these and other vacuum testers, insofar as is known, the testers have been operated in the manner of a bell jar in that the product to be tested has been brought to a condition of reduced pressure or vacuum with means to determine the distortion or deformation indication of the package itself.

In the apparatus of this invention it is desired that the tester provide a quick and inexpensive way to test the package in a non-destructive manner and with the testing establish the amount of vacuum in the sealed package wherein a flexible film makes up at least one portion of the package. In a quality control checking of vacuum packaged products which are systematically sampled on the production line or after they have been delivered to the customer, it is an absolute necessity for the packagers of meat and heat-and-serve products that these packages be hermetically sealed at least under a low level of vacuum so that unwanted air and other gases do not get to the product to cause deterioration of the product. The vacuum tester of this invention allows the vacuum package to be placed in a chamber having a transparent cover and after the cover is closed a throttling valve is used to bring the chamber to a gradual and determined level of vacuum whereat as the covering material of the package starts to relax this indicating the amount of vacuum within the package the vacuum level in the chamber is determined by reading the gauge connected to the chamber. No physical measuring or determining of the movement of the cover is provided or contemplated.

SUMMARY OF THE INVENTION

The present invention comprises a two-piece vacuum chamber of determined size in which a hinged cover piece is a transparent member through which the operator of the apparatus views the interior of the chamber. The chamber is connected to a source of vacuum which is operated at a continual high level and by means of a throttling valve the vacuum within the closed chamber is brought to a determined amount which is contemplated to be anywhere from 14 to 28 inches of mercury. With a package to be tested in the closed chamber an increasing level of vacuum is developed in the chamber until the flexible film covering portion of a package starts to relax whereat the throttling valve is stabilized to maintain that amount of vacuum within the chamber. This pressure level is then read upon a pressure gauge connected to the chamber.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the vacuum tester for packages with flexible covers as adopted for use in the non-destructive evaluation testing of said packages and showing a preferred means for performing said testing. This specific embodiment has been chosen for the purposes of illustration and description as shown in the accompanying drawing wherein:

BRIEF DESCRIPTION OF THE DRAWINGS

In the following description and in the claims various details will be identified by specific means for convenience; these names, however, are intended to be generic in their application. Corresponding reference characters refer to like members throughout the several figures of the drawing.

Figure 1:
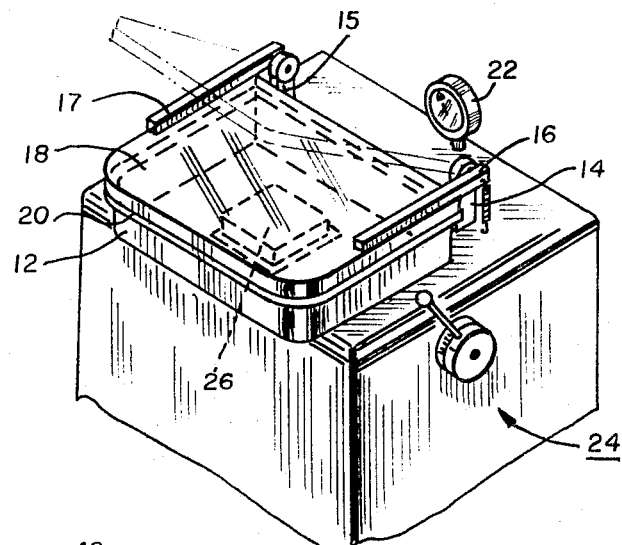
FIG. 1 represents an isometric view of the tester of this invention and showing in particular a fragmentary portion of a base support and a chamber as carried in and by this support. A transparent cover for closing the open top of the chamber is shown in solid outline in its closed condition and in phantom outline in its open condition.

The drawing accompanying, and forming part of, this specification discloses certain details of construction for the purpose of explanation of the broader aspects of the invention, but it should be understood structural details may be modified in various respects without departure from the concept and principles of the invention and that the invention may be incorporated in other structural forms than shown.

DESCRIPTION OF THE PREFERRED EMBODIMENT

Referring now in particular to FIG. 1 it is to be noted that the vacuum tester of this invention includes a base 10 in and on which is mounted the lower chamber portion 12 of the tester unit. This lower portion is shown as a cup-shaped member having a generally rectangular cross-sectional configuration. This lower chamber is supported by the base, and at its rear portion or by the base there is carried a pair of hinge supports or posts 14 and 15 which pivotally carry a pair of hinge leaf members 16 and 17. These leaf members are attached to and support a transparent cover 18 which is disposed to be removably seated on the top or upper edge of the bottom member portion 12. A gasket 20 is disposed to fit between the cover 18 and the upper face of the lower chamber portion 12 so that when the cover is lowered to a closed condition and the gasket is slightly compressed the chamber is sealed. As and when the interior of the chamber is brought to a condition of reduced pressure the cover is drawn to and is retained in position on the lower chamber portion permitting the chamber so formed to be brought to a condition of 20 to 30 inches of mercury when desired.

At the rear of the base 10 there is shown a gauge 22 which is connected to the vacuum system in such a manner that the gauge indicates the exact vacuum level or pressure in the chamber. This gauge 22 is of a conventional construction and design and preferably has a capacity for a normal reading of at least 30 or so inches of mercury. The level or degree of vacuum within the chamber is established by means of a throttling valve 24 carried on the side of the base 10. Within the chamber itself there is seen in dashed outline a package 26 which may be a package of luncheon meat or the like. This package is contemplated as having the enclosed contents in a condition of vacuum and with at least a portion of the package cover as being of a flexible material such as a plastic film. The non-destructive testing of this package will be described hereinafter.

Figure 2:
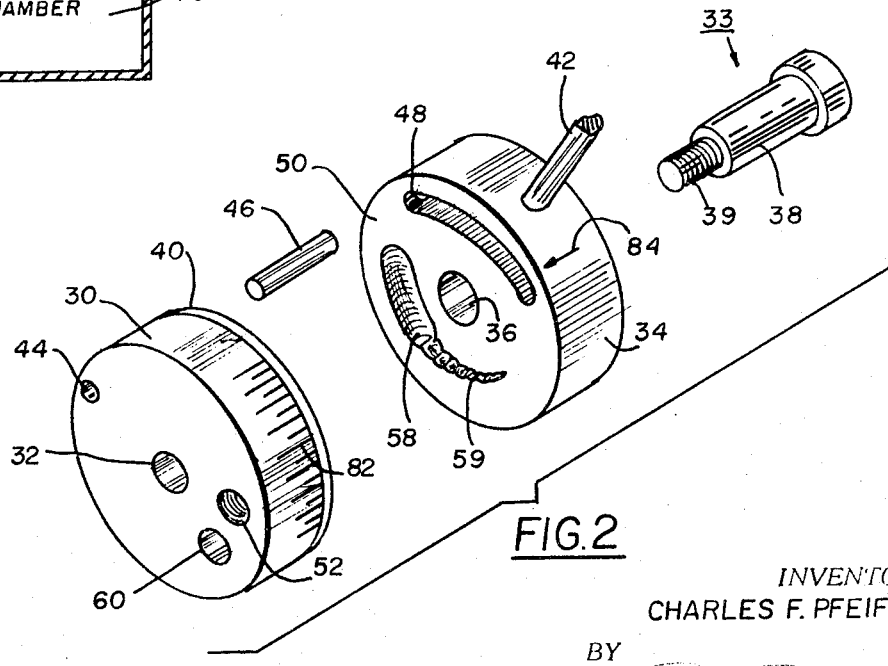
FIG. 2 represents an exploded isometric view showing the construction and relationship of the components of the throttling valve of this invention and the means by which it may be preset or by which it may be brought to a stabilized condition.

Referring next to FIG. 2 there is shown the relationship of those components forming the throttling valve 24 of this invention. This valve includes a fixed disc portion 30 mounted on the base 10. This disc has a centrally disposed aperture 32 for the passage therethrough of a support pin or cap screw 33 to be hereinafter more fully described. Adjacent to the fixed disc 30 is a like rotary member 34 having an aperture or bore 36 centrally disposed for the rotational mounting of this member on support 33. Support pin 33 is preferably a socket-headed shoulder bolt whose smooth body portion 38 provides the shaft upon which the rotary member 34 is rotatably mounted. A threaded end 39 of bolt 33 is mounted in a threaded hole in the disc 30 and the rotary member 34 is a Teflon (TM — E.I. DuPont) gasket 40 which provides a smooth sealing means for the two facing surfaces of disc 30 and rotary member 34. A handle 42 is attached to the rotary member 34 and is manipulated by the operator so that member 34 is rotated around the body portion 38 of pin 33.

The fixed member 30 has formed therein a through hole 44 in which is mounted a guide or stop pin 46 disposed to be fixedly mounted in the member 30. A portion or end of pin 46 extends from the face of member 30 and into an arcuate groove 48 or cut formed into the sliding face 50 of the rotary member 34. The pin 46 is slidable within the arcuate groove and acts as a stop pin when it reaches the ends of the groove to limit the rotary movement of member 34 around the body portion of pin 33. Through the fixed member 30 there is formed a vacuum inlet 52 which is threaded to receive a conduit to be hereinafter more fully identified. This inlet 52 extends to the inner face of the member 30 and through a hole formed in the gasket 40 which is retained in position by means of the support pin 33 and the guide pin 46. In the face 50 of member 34 there is formed a relief groove 58 which is arcuate in shape and has its right end 59 tapered in width and diminished in depth. This groove 58 or end 59 is always in flow communication with an air passageway 60 formed in and through fixed disc 30 and through a hole in gasket 40. When member 34 is rotated counterclockwise, as viewed in FIG. 2, first the tapered end 59 and finally the full size of arcuate groove 58 is brought into flow communication with the vacuum inlet 52 so that a determined and desired amount of air may be bled into the vacuum passageway 52.

Figure 3:
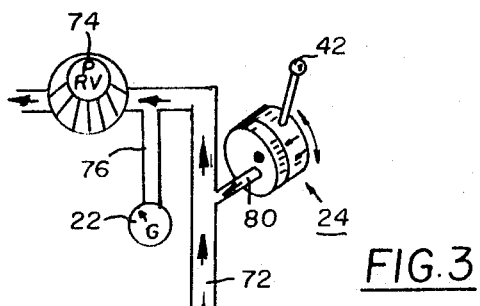
FIG. 3 represents a somewhat schematic view of the operating circuit of this invention.

Referring finally to the diagram of FIG. 3 it is to be noted that the chamber, as to this diagram, is a closed chamber and is generally designated 70. From this chamber a conduit 72 extends to a positive displacement pump which is preferably a two-stage vacuum pump identified as 74. From conduit 72 a conduit 76 is flow connected and extends to gauge 22. From the outlet 52 on the back of the valve 24 a conduit 80 extends to and into flow communication with the conduit 72.

USE AND OPERATION OF THE VACUUM TESTER

With the vacuum pump 74 being driven at a determined rate by an electric motor or other power source it is contemplated that the packaged product 26 to be tested is within the lower chamber portion 12. The transparent cover 18 is now moved into the closed condition of FIG. 1 and the operator or assistant urges the cover closed to cause the cover and the upper surface of the bottom chamber 12 to lightly compress gasket 20. Valve 24 during closing of the cover is in the open condition with member 34 rotated in the counterclockwise maximum condition so that the enlarged portion of groove 58 is in flow communication with vacuum inlet 52 and air passageway 60. To apply vacuum to the chamber 70 the valve 24 is rotated clockwise to a sufficient extent so that the air communication from inlet 60 is partly throttled permitting the vacuum from pump 74 to start to draw air form chamber 70. Manipulation or rotation of the valve allows vacuum to be built up within the chamber. As this occurs the necessity for holding the top cover 18 in sealing position is removed permitting the operator to direct his attention and observation to the package being tested without further holding of the cover in place.

The operator continues to manipulate the handle 42 to cut down the entry of air into the line 72 through the valve 24 until the vacuum or reduced pressure within the chamber 70 reaches a determined or desired level. To increase the vacuum within the chamber the flow of the air through conduit 80 is reduced until it is completely shut off whereupon the vacuum pump 74 evacuates the chamber 70 to its maximum capacity which is usually about 28 to 30 in. of mercury. As most packages being checked fall within the range of 14 to 22 inches of mercury the necessity of a much higher level of vacuum is generally not required.

With the package 26 in the chamber and the chamber being gradually reduced as to its internal pressure the flexible cover portion of the package is observed by the operator until the flexible cover begins to relax whereat the operator throttles the valve 24 back until it reaches a stabilized condition. The operator then adjusts the valve 24 until the relaxed covering of the package is at a discernible relaxed state and then by observing the reading of the gauge determines the amount of vacuum within the package. After the operator has made this determination he then rotates the valve 24 counterclockwise so as to permit a large volume of air to enter the passageway 72 and from there to the chamber 70 to reduce the vacuum within the chamber until finally the chamber reaches atmospheric pressure. As the vacuum within the chamber approaches atmospheric condition the vacuum within the package itself draws the package covering again tightly around the product and to the condition it was in before the package was tested. With the test now completed and the chamber at atmospheric pressure the lid of the chamber is opened and the package is removed in the same covered condition as it was before it was placed within the vacuum tester. It is to be noted that if the package was not properly sealed and/or has a leak in the covering and there is little or no vacuum within the package then the relaxing of the covering on the package occurs substantially, immediately indicating to the operator of the vacuum tester that the package failed to pass inspection. The weak or leaking point in the package is usually readily seen and when the vacuum is shut off and the chamber is again brought to atmospheric pressure the flexible cover on the package does not readily return to and tightly adhere to the package.

The above-described tester of this invention provides a rapid means to precisely check the vacuum within the package being tested. The modulating valve system in which both vacuum and atmospheric air are selectively available to the chamber in determined amounts provides a convenient and readily operable testing means by which the operator can readily perform a precise test evaluation.

In certain testing operations it is not necessary that the chamber be gradually increased in its vacuum level to ascertain the precise amount of vacuum in the package but rather the packages are tested only to insure that they are not "leakers" and that they have a minimum level of vacuum in the package. To accommodate such testing the fixed disc has a scale 82 inscribed or affixed on its outer periphery. An arrow 84 on the rotatable member 34 provides an indicator which permits the repeated moving of the movable member to a predesignated position to achieve a determined vacuum level in the closed chamber.

The method for testing the vacuum within the package includes the step of opening a vacuum testing chamber by lifting a transparent cover from a lower chamber member; placing a packaged product within the lower chamber, said packaged product being vacuum packaged and having a flexible cover portion; closing the chamber by lowering the transparent cover so as to bring the cover and lower member into a sealed condition; manipulating a valve to connect the chamber to a source of vacuum and modulating the valve to provide an increasing source of vacuum; observing the package through the transparent cover; stabilizing the reduced pressure within the chamber when the flexible cover of the package begins to relax its packaged condition; noting the degree of vacuum in the chamber when the cover reaches this relaxed condition by observing the pressure reading of a gauge connected to the chamber and after completing the test, bringing the chamber again to atmospheric pressure; opening the chamber by lifting the transparent cover, and removing the packaged product from the lower chamber.

It is to be noted that although the cover 18 is described as being a transparent member a cover member having a window portion could be used instead. It is also noted that the cover rather than being hinged could be a loose member having handles for lifting into and from a seating position on the top of the lower chamber. If a large source of vacuum is available, the self-contained vacuum producing means normally provided in the base need not be supplied as a part of the apparatus.

Terms such as "up," "down," "bottom," "top," "front," "back," "in," "out" and the like are applicable to the embodiment shown and described in conjunction with the drawing. These terms are merely for the purposes of description and do not necessarily apply to the position in which the vacuum tester may be constructed or used.

While a particular embodiment of the vacuum tester and its operating circuit and method has been shown and described it is to be understood the invention is not limited thereto since modifications may be made within the scope of the accompanying claims and protection is sought to the broadest extent the prior art allows.

What is claimed is:

1. A vacuum tester for the non-destructive testing of vacuum packages wherein at least a portion of the package covering is a flexible member, said tester including: (a) a base; (b) a lower chamber portion carried by said base and with this chamber portion having an open top; (c) a cover member having at least a portion thereof as a transparent window, said cover member adapted to seat upon the open top of the lower chamber and to close the chamber; (d) means for sealing the joint between the cover and chamber to make the closed chamber pressure tight; (e) means for providing a source of vacuum to the chamber during the use cycle of the tester; (f) a throttle valve disposed to be moved to an infinity of positions between two established stop limits, the valve as it is moved varying the amount of air permitted to be drawn into a conduit extending from the chamber to the source of vacuum, the valve sized to accommodate the capacity of the vacuum produced in the closed and sealed chamber and in the other limit of operation the flow of air to the conduit is reduced to substantially none permitting the chamber to be brought to a vacuum pressure level such as 28 to 30 inches of mercury, and (g) a vacuum gauge connected to the conduit extending from the chamber to the source of vacuum, said gauge disposed to indicate the level of the pressure in the chamber.

2. A vacuum tester as in claim 1 in which the cover is a transparent plate member and is carried by hinge means so as to be lifted and lowered by grasping an opposite edge of the cover.

3. A vacuum tester as in claim 1 in which the throttling valve including a rotatable member formed with a relief groove of arcuate shaped and having a tapered end of diminished depth and width, the relief groove formed in a sliding face of the rotatable member and providing a continuation communication means with an air inlet, said groove and tapered end disposed to be selectively moved in way of a vacuum conduit means so as to modulate a flow of air to the vacuum conduit, said air flow being adjustable from a lower limit of no air flow to a high limit substantially equal to the capacity of the vacuum means.

4. A vacuum tester as in claim 1 in which the source of vacuum is a two-stage vacuum pump carried by and within the base, said pump being driven at a determined rate by motor means such as an electric motor.

5. A vacuum tester as in claim 1 in which the throttling valve has a disc-like fixed member and a disc-like rotary member, and in which a graduated scale is provided on the outer periphery of one of said members and a pointer means such as an arrow is provided on the outer periphery of the other member.

6. A method of non-destructive testing of a vacuum packaged product wherein at least a portion of the package covering is a flexible member, said method including the steps of: (a) opening a vacuum testing chamber by lifting a transparent cover member from in way of an open top of a lower chamber member; (b) placing at least one vacuum packaged product within the lower chamber with the flexible cover portion of the package being observable through the open top of the chamber; (c) closing the chamber by lowering the transparent cover so as to bring the cover to and into a sealing condition with the open top of the lower member; (d) manipulating a throttling valve so as to connect the closed chamber to a source of vacuum and modulating the valve so as to provide an increasing source and amount of vacuum within the chamber; (e) observing the package being tested through the transparent cover as the vacuum or reduced pressure within the chamber is increased; (f) stabilizing the reduced pressure within the chamber by adjusting the throttle valve when the flexible cover portion on the package begins to relax its "as packaged" condition; (g) noting the amount of vacuum pressure in the chamber when the cover reaches this relaxed condition by observing the pressure reading of a gauge connected to the chamber, and after completing this reading and observation; (h) bringing the chamber again to atmospheric pressure; (i) opening the chamber by lifting the cover, and (j) removing the packaged product from the lower chamber.

7. The method of testing a vacuum packaged product as in claim 6 including the further step of holding the cover member to the open end of the lower member to compress to a determined degree a gasket therebetween as vacuum pressure is initially developed within the chamber.

* * * * *